Patented May 17, 1938

2,117,733

UNITED STATES PATENT OFFICE 2,117,733

AZO DYESTUFFS

Hans Krzikalla and Paul Garbsch, Ludwigshafen-on-the-Rhine, Germany, assignors to General Aniline Works, Inc., New York, N. Y., a corporation of Delaware No Drawing. Application November 13, 1936, Serial No. 110,638. In Germany November 23, 1935

8 Claims. (Cl. 260—96)

The present invention relates to azo dyestuffs.

We have found that valuable azo dyestuffs are obtained by coupling the diazo compounds of aromatic amines free from sulphonic and carboxylic acid groups with aralkyl-aryl-amines free from sulphonic and carboxylic acid groups corresponding to the general formula

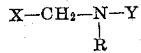

wherein R stands for an aliphatic radicle attached to the nitrogen atom by means of a —CH$_2$— group and containing at least one oxygen atom, and wherein X and Y are radicles of the benzene series, which may be substituted by halogen, alkyl, oxalkyl, amino or nitro groups, but there must remain in the ring Y at least one position capable of coupling.

The aliphatic radicle may be for example a hydroxyethyl, hydroxypropyl or dihydroxypropyl radicle, or a hydroxyethyl alkyl ether, hydroxyalkyl oxalkyl ether, or hydroxy alkyl ester radicle.

Suitable compounds of the said kind may be prepared for example by the addition of one, two, three or more molecular proportions of ethylene oxide to N-benzylanilines. The oxalkyl compounds thus obtained may be converted into the corresponding ethers or esters by treatment with alkylating agents, such as toluene-sulphonic acid alkyl esters, or with acetic acid anhydride, respectively.

The dyestuffs obtained according to our invention are especially suitable for dyeing cellulose esters and ethers. They may also be used for coloring paraffin wax and stearine and also, by reason of their good solubility in organic solvents, for the preparation of colored spirit and cellulose ester lacquers. The dyestuffs have a good fastness to sublimation and are therefore also very suitable for use as double-tone and intaglio printing inks.

The following examples will further illustrate how this invention may be carried out in practice but the invention is not restricted to these examples. The parts are by weight.

Example 1

The diazo compound of 139 parts of 1-amino-4-nitrobenzene is coupled with a solution of 240 parts of N-hydroxyethyl-N-benzylaminobenzene in 3000 parts of water and 170 parts of concentrated hydrochloric acid. A dyestuff is thus obtained which colors nitrocellulose ester lacquers brilliant red shades of good fastness to light.

The dyestuff may be dissolved in benzene and treated with acetic acid anhydride. The acylated dyestuff thus obtained colors nitrocellulose lacquers similar red shades. The same dyestuff is obtained if N-acetohydroxyethyl-N-benzylaniline be used instead of N-hydroxyethyl-N-benzylaniline.

If N-hydroxyethyl-N-(4-nitrobenzyl)-aminobenzene be used as the coupling component, a dyestuff having similar properties and a somewhat more yellow shade is obtained.

Example 2

A solution of 240 parts of N-hydroxyethyl-N-benzylaminobenzene in 3000 parts of water and 170 parts of concentrated hydrochloric acid is allowed to flow into the diazo solution of 172 parts of 1-amino-2-chlor-4-nitrobenzene while stirring. A dyestuff is obtained which colors nitrocellulose ester lacquers red shades.

If the addition compounds derived from 2, 3 or even more, as for example 10 or 12 molecular proportions of ethylene oxide and 1 molecular proportion of N-benzylaminobenzene or N-dihydroxy-propyl-N-benzylaminobenzene be used as coupling component instead of N-hydroxyethyl-N-benzylaminobenzene, dyestuffs having similar properties are obtained.

Example 3

The diazo compound of 207 parts of 1-amino-2.5-dichlor-4-nitrobenzene or 1-amino-2.6-dichlor-4-nitrobenzene is poured onto ice and there is added thereto a solution of 240 parts of N-hydroxyethyl-N-benzylaminobenzene in 5000 parts of water and 170 parts of concentrated hydrochloric acid. The dyestuffs thus obtained color nitrocellulose ester lacquers reddish shades if 1-amino-2.5-dichlor-4-nitrobenzene has been used as the diazo component or brown shades if 1-amino-2.6-dichlor-4-nitrobenzene has been used as the diazo component. The dyestuffs have a good fastness to sublimation and are therefore also specially suitable for use for double-tone and intaglio printing inks.

If N-hydroxyethyl-N-benzyl-ortho-toluidine be employed instead of N-hydroxyethyl-N-benzylaniline azo dyestuffs having similar properties are obtained.

What we claim is:—

1. Azo dyestuffs corresponding to the general formula

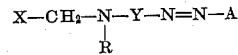

wherein R stands for an aliphatic radicle attached to the nitrogen atom by means of a —CH$_2$— group and containing at least one oxygen atom, wherein X and Y stand for radicles of the benzene series, and wherein A stands for a radicle of the benzene series, the dyestuffs being free from sulphonic and carboxylic acid groups.

2. Azo dyestuffs corresponding to the general formula

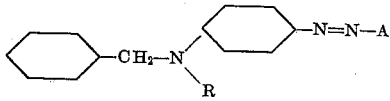

wherein R stands for an aliphatic radicle attached to the nitrogen atom by means of a —CH$_2$— group and containing at least one oxygen atom, and wherein A stands for a radicle of the benzene series, the dyestuffs being free from sulphonic and carboxylic acid groups.

3. Azo dyestuffs corresponding to the general formula

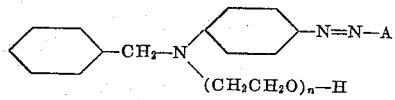

wherein $n$ stands for a whole number and wherein A stand for a radicle of the benzene series, the dyestuffs being free from sulphonic and carboxylic acid groups.

4. Azo dyestuffs corresponding to the general formula

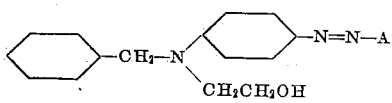

wherein A stands for a radicle of the benzene series, the dyestuffs being free from sulphonic and carboxylic acid groups.

5. Azo dyestuffs corresponding to the general formula

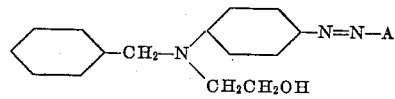

wherein A stands for a radicle of the benzene series substituted by a nitro group in para-position to the azo group, the dyestuffs being free from sulphonic and carboxylic acid groups.

6. The azo dyestuff of the formula

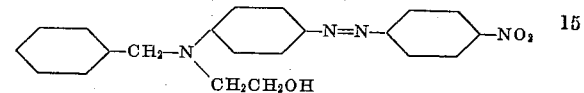

7. The azo dyestuff of the formula

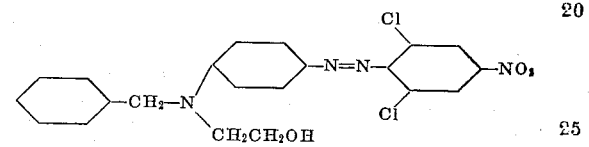

8. The azo dyestuff of the formula

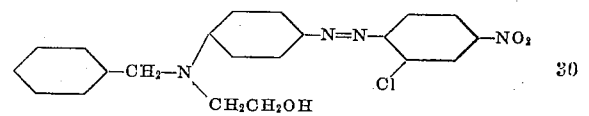

HANS KRZIKALLA.
PAUL GARBSCH.